Patented Oct. 23, 1951

2,572,248

UNITED STATES PATENT OFFICE 2,572,248

ELECTROLYTIC METHOD OF MAKING BORON

Hugh S. Cooper, Shaker Heights, Ohio, assignor to Walter M. Weil, Cleveland, Ohio No Drawing. Application October 8, 1949, Serial No. 120,414

9 Claims. (Cl. 204—64)

1

This invention relates to electro-metallurgy and particularly to an electrolytic method of producing substantially pure elemental boron.

The principal object of the invention is to provide a method for producing substantially pure elemental boron on a commercial scale.

Another object of the invention is to provide a method for producing elemental boron in a form which lends itself readily to melting, pressing, and sintering into various shapes and to diverse uses in the metallurgical, chemical, and other industrial arts.

A further object of the invention is to produce elemental boron of sufficient purity to be suitable for direct use in the production of high purity compounds of boron and boron alloys.

Boron does not exist in a free state in nature. Though practically insoluble in acids and almost as hard as silicon carbide, the free element has been put to no practical use, as such, prior to the last decade, and is still used only to a very small extent, if at all.

It has previously been discovered that elemental boron has a number of properties that make it potentially of great value in many fields. For example, its high specific resistance of about 775,000 ohms at 27° C. drops to about 4 ohms at 600° C., a characteristic that lends itself to extensive use in various types of electrical apparatus.

Mere traces of boron in carbon change the temperature coefficient of resistance from negative to positive, giving metal-like electrical characteristics to the carbon.

Boron is a very powerful deoxidizer and has a high affinity for various gases. This makes it highly useful in metallurgical fields, as a degasifying agent in the production of dense castings and the like. Boron is also practically completely insoluble in copper, being quite a unique metal in this respect, and is therefore probably the best agent known for the treatment of molten copper to remove occluded gases therefrom during the making of copper products generally.

Due to its great hardness, free boron and boron in the form of alloys and compounds, such as metal borides, should find many applications in industry when the free metal is available in commercial quantities.

While it is said that boron oxide ($B_2O_3$) may be reduced by heating in the presence of magnesium to produce magnesium oxide and free boron, the process generally carries the boron only to what has been termed a suboxide ($B_7O$). When aluminum is employed in place of magnesium, aluminum boride ($AlB_{12}$) is the result.

2

Boron chloride has been broken down by a high tension arc in the presence of hydrogen to give the pure element, but the yields are low and the process is impractical for the production of boron in commercial quantities.

The electrolysis of boron oxide in a fused bath of magnesium oxide and magnesium fluoride has been tried, but bath temperatures of 1100° to 1200° C. were found to be necessary, and metal of only about 92% purity was obtained, probably due in part to the high temperature and to the difficulty of separating the highly insoluble magnesium salts from the product.

Boron is a member of group III of the periodic table, being grouped with aluminum, lanthanum, yttrium, etc., of which only aluminum is produced or used in commercial quantities. None of the prior art processes for producing any of these metals in free form is, so far as I am aware, at all useful or practical for producing free boron.

In general, my process involves the electrolysis of a fused bath of potassium fluoborate and potassium chloride. While processes have heretofore been employed to produce so-called refractory metals falling in other groups of the periodic table by electrolysis of their double fluoride salts, the same processes, when applied to the electrolysis of double fluoride salts of boron, have either failed to operate at all for their intended purpose, have yielded a product too impure for practical use, or have involved such serious operating difficulties as to be entirely impractical as commercial processes. Such prior art processes, therefore, instead of pointing the way to the accomplishment of the foregoing objectives, have actually served as misleading sign posts directing the art away from attempts to produce boron by the electrolysis of double fluoride salts.

In accordance with the present invention, I have found that elemental boron in the form of substantially pure crystalline aggregates can be efficiently produced by electrolyzing a fused bath of potassium chloride and potassium fluoborate ($KBF_4$) at temperatures in the range of about 650° to about 1000° C., the boron being deposited on the cathode of the electrolytic cell in its granular form together with predominantly water and acid soluble impurities, and being readily removable from the cathode and purified by washing. For a better understanding the process and the conditions and apparatus suitable for carrying it out in practice, the following illustrative example will be described in detail.

An electrolytic cell for use in the process of this invention may include an externally heated crucible of graphite or similar electrically conductive refractory material protected by an outer shell of a high heat resistant metal, such as the alloy of nickel, chromium, and iron marketed under the name Inconel. If desired, heating of the contents of the crucible may be carried out by electrical induction or electrical resistance heating in the bath itself. The crucible forms the anode of the cell, and the alloy shell is connected to the positive terminal of a source of direct current. The cathode preferably consists of one or more metal plates mounted for vertical movement into and out of the bath and connected to the negative terminal of the current source.

Potassium chloride is first charged into the crucible and melted, and potassium fluoborate, in the preferred proportion of about 1 part to 5 of the potassium chloride, is added with continued heating to bring the bath to the operating temperature. An operating temperature of about 800° to 850° C. is preferred, though this temperature is not highly critical, the process being operative from a minimum of about 650° C. to a maximum of about 1000° C. When the desired temperature has been reached, the cathode is lowered into the bath and the current is applied to begin the electrolysis. As the salts of the bath are decomposed, chlorine is liberated at the anode and elemental boron is deposited on the cathode and adheres thereto.

As the electrolysis proceeds, the bath level is lowered, and potassium fluoborate and potassium chloride may be added periodically in sufficient amount to replace the amounts consumed by the release of chlorine and boron and the formation of potassium fluoride, and to maintain the desired bath level. It is preferable that the potassium chloride be present in greater amount than the potassium fluoborate but, over a wide range the proportions of these two ingredients in the bath seem to have little effect upon the efficiency of the electrolytic process, and it appears that neither the initial proportions mentioned above nor the rate at which each of these materials is added is at all critical.

At the beginning of electrolysis, the current flow is relatively high with a voltage of about 7 volts. As electrolysis continues while maintaining the voltage substantially constant, the current flow drops about 40% due to change in resistance of the bath, a characteristic of baths containing fluorides. Stirring of the bath to minimize the anode effect is unnecessary because substantial ebullition of the bath is caused by the current passing therethrough.

While I do not wish to be limited by any theory of operation, it appears that the potassium chloride is electrolytically decomposed to release chlorine at the anode, and that the potassium reacts with the boron salt to liberate boron at the cathode and produce potassium fluoride in the bath. In addition to serving in this fashion as the principal electrolyte, the fused potassium chloride is a solvent for the potassium fluoborate, which would be unstable alone at the temperature of operation, and maintains the desired fluidity of the bath.

The use of potassium as the positive radical, both in the chloride electrolyte and in the double fluoride compound of boron, appears to be essential. If sodium chloride is substituted, even in part, for either the potassium chloride or the potassium fluoborate, the results are adversely affected. Complete substitution of sodium for potassium renders the process commercially impractical, if not totally inoperative.

Any metal sufficiently inert to the bath components and that does not combine or react with boron at the bath temperatures employed may be used to form the cathode. However, as indicated above, the inertness of copper to boron makes it an ideal metal for this purpose. Molybdenum is also a highly satisfactory cathode material at the temperatures employed.

At the conclusion of the electrolysis, the current is turned off, and the cathode is withdrawn, the boron clinging to it quite tenaciously. To minimize oxidation, the boron coated cathode may be quickly covered with dry salt, such as sodium chloride, and allowed to cool. After cooling down to a temperature below a visible red glow of the material on the cathode, the cathode is immersed in water for a period of several hours or longer. Any boron still clinging to the cathode is then readily removed. Upon prolonged digestion of the boron with water, and then with strong hydrochloric acid, the metal is finally washed with water, dried, and sifted, and is then ready for use.

The product, purified as prescribed above, is in the form of crystalline clusters or aggregates that resemble small coke-like masses and is of high purity, as evidenced by the following representative analysis:

| | Per cent |
|---|---|
| Boron | 99.51 |
| Carbon | 0.29 |
| Silicon | 0.14 |
| Iron | 0.06 |
| | 100.00 |

The metal is extremely hard, having a Knoop hardness value between 1850 and 1900, compared to about 1050 to 1100 for tungsten carbide and nitrided high speed steels, 2000 for silicon carbide, and 2200 for boron carbide.

Having described my invention in detail, I claim:

1. The process of preparing boron comprising electrolyzing a fused bath consisting essentially of potassium chloride and potassium fluoborate.

2. The process of preparing boron comprising preparing a fused mixture consisting essentially of potassium chloride and potassium fluoborate, electrolyzing said mixture in an electrolytic cell having a cathode composed of a metal which does not combine or react with boron at the bath temperature, and recovering boron from the cathode.

3. The process of preparing boron comprising preparing a fused mixture consisting essentially of potassium chloride and potassium fluoborate, electrolyzing said mixture in an electrolytic cell while maintaining the mixture in the range of 650° to 1000° C., and removing the cathode of the electrolytic cell for recovery of boron deposited thereon.

4. The process of preparing boron comprising preparing a fused mixture consisting essentially of potassium chloride and potassium fluoborate, electrolyzing said mixture in an electrolytic cell while maintaining the mixture in the range of 800° to 850° C., and removing the cathode of the electrolytic cell for recovery of boron deposited thereon.

5. The process of preparing boron comprising preparing a fused mixture consisting essentially of a major proportion of potassium chloride and a minor proportion of potassium fluoborate, electrolyzing said mixture in an electrolytic cell while maintaining the mixture in the range from 650° to 1000° C., adding sufficient potassium chloride to the mixture in the course of the process to maintain a preponderance of potassium chloride over potassium fluoborate in the bath, and recovering boron from the cathode.

6. The process of preparing boron comprising preparing a fused mixture consisting essentially of a major proportion of potassium chloride and a minor proportion of potassium fluoborate, electrolyzing said mixture in an electrolytic cell while maintaining the mixture in the range from 650° to 1000° C., adding sufficient potassium chloride to the mixture during the course of electrolysis to maintain a preponderance of potassium chloride over potassium fluoborate in the bath, withdrawing and cooling the cathode, immersing it in water, and removing boron therefrom.

7. The process of preparing boron comprising preparing a fused mixture consisting essentially of a major proportion of potassium chloride and a minor proportion of potassium fluoborate, electrolyzing said mixture in an electrolytic cell to deposit boron on the cathode while maintaining the mixture in the range from 650° to 1000° C., adding sufficient potassium chloride to the mixture during the course of the electrolysis to maintain a preponderance of potassium chloride over potassium fluoborate in the bath, recovering boron from the cathode, and purifying the boron by washing with water and acid.

8. The process of preparing boron comprising preparing a fused mixture consisting essentially of a major proportion of potassium chloride and a minor proportion of potassium fluoborate, electrolyzing said mixture in an electrolytic cell to deposit boron on the cathode, said cell having a cathode composed essentially of a metal which does not combine or react with boron at the bath temperature, maintaining the mixture at a temperature in the range from 650° to 1000° C. during the electrolysis step, adding sufficient potassium chloride to the mixture during the electrolysis step to maintain a preponderance of potassium chloride over potassium fluoborate in the bath, and recovering boron from the cathode.

9. The process of preparing boron comprising preparing a fused mixture consisting essentially of a major proportion of potassium chloride and a minor proportion of potassium fluoborate, electrolyzing said mixture in an electrolytic cell to deposit boron on the cathode, maintaining the mixture at a temperature in the range from 800° to 850° C. during the electrolysis step, adding sufficient potassium chloride to the mixture during the electrolysis step to maintain a preponderance of potassium chloride over potassium fluoborate in the bath, and recovering boron from the cathode.

HUGH S. COOPER.

REFERENCES CITED

The following references are of record in the file of this patent:

"Transactions of The American Electrochemical Society," vol. 47 (1925), pages 30 through 33.